(12) United States Patent
Roettger et al.

(10) Patent No.: US 7,779,633 B2
(45) Date of Patent: Aug. 24, 2010

(54) METHOD FOR DETERMINING THE EXHAUST BACK PRESSURE UPSTREAM OF A TURBINE OF AN EXHAUST-DRIVEN TURBOCHARGER

(75) Inventors: Daniel Roettger, Eynatten (BE); Christian Winge Vigild, Aldenhoven (DE); Alain Marie Roger Chevalier, Henri-Chapelle (BE); Simon Petrovic, Heer Maastricht (NE); Evangelos Karvounis, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 441 days.

(21) Appl. No.: 11/853,582

(22) Filed: Sep. 11, 2007

(65) Prior Publication Data
US 2008/0168771 A1 Jul. 17, 2008

(30) Foreign Application Priority Data
Sep. 13, 2006 (DE) .................. 10 2006 042 872

(51) Int. Cl.
*F02B 33/44* (2006.01)
*F02M 25/07* (2006.01)
(52) U.S. Cl. .................. 60/602; 60/612; 60/605.2
(58) Field of Classification Search ............. 60/602, 60/612, 605.1, 605.2
See application file for complete search history.

(56) References Cited

U.S. PATENT DOCUMENTS

| | | | | |
|---|---|---|---|---|
| 4,835,963 A | * | 6/1989 | Hardy | .................. 60/602 |
| 6,067,800 A | * | 5/2000 | Kolmanovsky et al. | ....... 60/602 |
| 6,360,541 B2 | * | 3/2002 | Waszkiewicz et al. | ...... 60/605.2 |
| 7,043,914 B2 | * | 5/2006 | Ishikawa | .................. 60/605.2 |
| 7,089,738 B1 | * | 8/2006 | Boewe et al. | ............... 60/605.2 |
| 7,159,568 B1 | * | 1/2007 | Lewis et al. | .................. 123/431 |
| 7,278,396 B2 | * | 10/2007 | Leone et al. | ................. 123/431 |
| 7,322,194 B2 | * | 1/2008 | Sun et al. | ..................... 60/605.2 |
| 7,367,188 B2 | * | 5/2008 | Barbe et al. | ................ 60/605.2 |
| 7,461,508 B2 | * | 12/2008 | Rosin et al. | .................... 60/612 |
| 7,493,762 B2 | * | 2/2009 | Barbe et al. | ................ 60/605.2 |
| 7,540,148 B2 | * | 6/2009 | Wild et al. | ..................... 60/602 |
| 7,597,092 B2 | * | 10/2009 | Eser et al. | .................... 123/676 |
| 2009/0077968 A1 | * | 3/2009 | Sun | ........................... 60/605.2 |

FOREIGN PATENT DOCUMENTS

JP 62113814 A * 5/1987

* cited by examiner

*Primary Examiner*—Thai Ba Trieu
(74) *Attorney, Agent, or Firm*—Julia Voutyras; Alleman Hall McCoy Russell & Tuttle LLP

(57) ABSTRACT

The present application relates to a method for determining the exhaust back pressure $p_3$ upstream of a turbine, which is arranged in the exhaust line of an internal combustion engine equipped with an engine management system (1), which exhaust line is intended to lead off the exhaust gas from a number cylinders of the internal combustion engine. The method includes determining the exhaust back pressure $p_3$ upstream of a turbine, by means of which the exhaust back pressure $p_3$ can still be determined precisely but at little cost compared to methods known in the state of the art.

18 Claims, 4 Drawing Sheets

METHOD FOR DETERMINING THE EXHAUST BACK PRESSURE UPSTREAM OF A TURBINE OF AN EXHAUST-DRIVEN TURBOCHARGER The present application claims priority to Germany Patent Application No. 102006042872.2, filed Sep. 13, 2006, the entire contents of which are incorporated herein by reference.

DESCRIPTION OF THE DRAWINGS

The present application will be described in more detail below with reference to an exemplary embodiment and FIGS. 1-4, of which.

DETAILED DESCRIPTION

Figure 1:
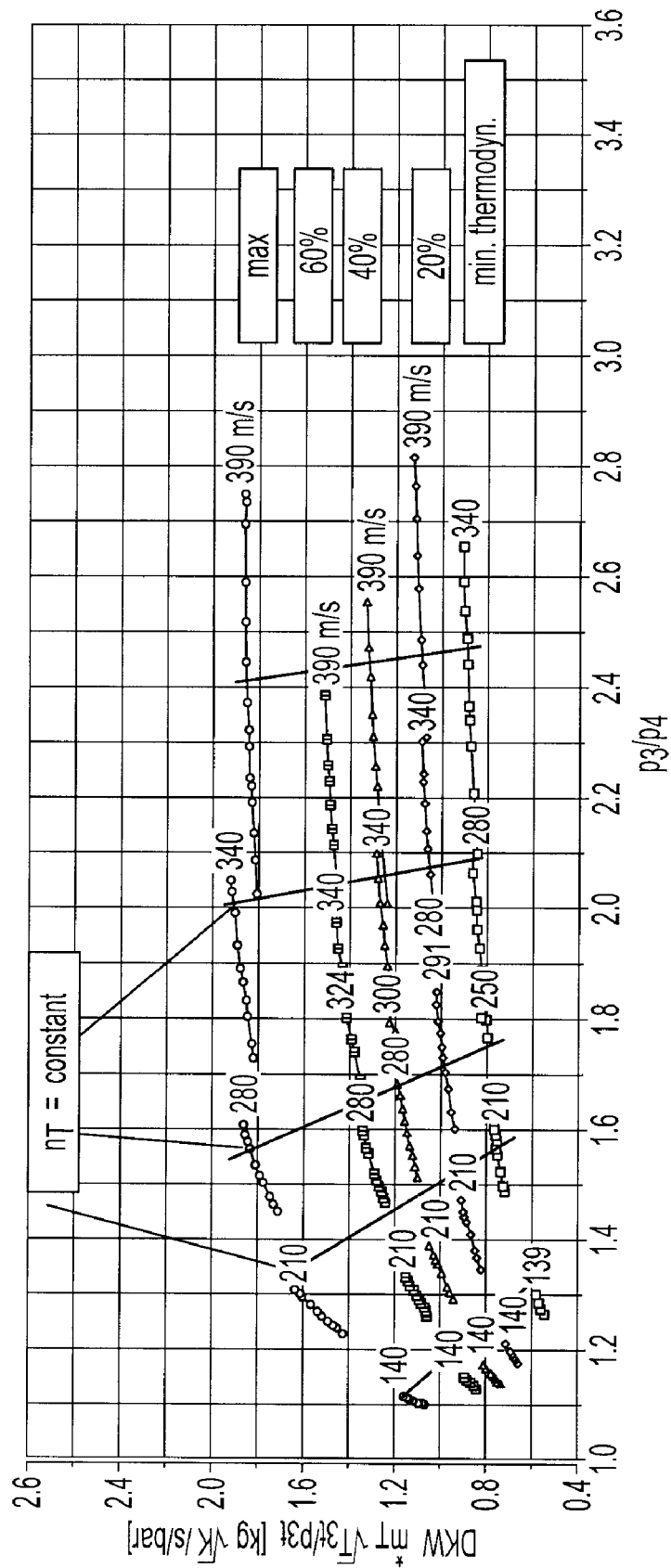
FIG. 1 shows a turbine characteristics map of an exhaust-driven turbocharger with variable turbine geometry (VTG), and FIG. 2 in schematic form shows the general method according to one embodiment of the method for an exhaust-driven turbocharger with variable turbine geometry.

The present application relates to a method for determining the exhaust back pressure $p_3$ upstream of a turbine, (406, see FIG. 4), which is arranged in an exhaust line (404, see FIG. 4) of an internal combustion engine (402, see FIG. 4) equipped with an engine management system, which exhaust line is intended to lead off the exhaust gas from j cylinders (e.g., a number of cylinders which can vary) of the internal combustion engine.

In the context of the present application the term internal combustion engine includes both diesel engines and spark-ignition engines.

In recent years there has been a trend towards supercharged engines, the supercharging primarily being a method for boosting the power output, in which the air needed for the engine combustion process is compressed. The economic importance of these engines for the automotive industry continues to steadily increase.

For supercharging, an exhaust-driven turbocharger is generally used, in which a compressor and a turbine are arranged on the same shaft, an exhaust line, which is intended to lead off the exhaust gas from the internal combustion engine, serving to deliver a hot exhaust gas mass flow $m_T$ to the turbine, where it expands, giving off energy, so that the shaft is made to rotate. In the process the pressure p in the exhaust gas falls from a higher pressure $p_3$ upstream of the turbine to a lower pressure $p_4$ downstream of the turbine. The energy which the exhaust gas mass flow $m_T$ imparts to the turbine and ultimately to the shaft is used to drive the compressor, likewise arranged on the shaft. The compressor delivers and compresses the charge air $m_{fresh\ air}$ fed to it, thereby supercharging the cylinders.

In exhaust turbo-charging, therefore, the exhaust gas energy is used to compress the combustion air $m_{fresh\ air}$. In addition, charge-air cooling is usually provided, which serves to cool the compressed combustion air before it enters the cylinders. The cooling further increases the density of the charge air, so that the charge-air cooling assists or contributes to the compression of the charge air.

The advantage of an exhaust-driven turbocharger compared to a mechanical supercharger, for example, is that no mechanical connection is required in order to transmit power between the supercharger and the internal combustion engine. Whereas a mechanical supercharger obtains the energy needed to drive it entirely from the internal combustion engine, thereby reducing the power available and in this way having a detrimental effect on the efficiency, the exhaust-driven turbocharger—as mentioned—utilizes the exhaust gas energy of the hot exhaust gases.

As already stated, supercharging is becoming increasingly important. The reasons for this are complex and will be briefly outlined below.

Supercharging primarily serves to boost the power output of the internal combustion engine. The air needed for the combustion process is thereby compressed, so that a greater mass of air can be delivered to each cylinder in each operating cycle. As a result, it is possible to increase the mass of fuel and hence the mean pressure $p_{me}$.

Supercharging is a suitable means for increasing the power output of an internal combustion engine for the same swept volume, or for reducing the swept volume for the same power output. In each case, supercharging leads to an increase in the volumetric efficiency and a more favorable power-to-mass ratio. For the same vehicle marginal conditions it is thus possible to shift the load collective towards higher loads, where the specific fuel consumption is lower. The latter is also referred to as downsizing.

Supercharging consequently supports what is, in the development of combustion engines, an ongoing effort to minimize the fuel consumption, i.e. to improve the efficiency of the internal combustion engine.

A further fundamental aim is to reduce the pollutant emissions. Supercharging of the internal combustion engine may also be useful in achieving this object. By purposely configuring the supercharging it is in fact possible to secure advantages in terms of efficiency and exhaust emissions. Thus, by means of suitable supercharging in the case of a diesel engine, for example, the nitrogen oxide emissions can be reduced without sacrificing efficiency. At the same time it is possible to exert a beneficial influence on hydrocarbon emissions. Hydrocarbon emissions, which correlate directly with the fuel consumption, also diminish as fuel consumption falls. Supercharging is therefore suited to the reduction of pollutant emissions.

In order to meet future limits for pollutant emissions, however, further measures will also be necessary.

Among other things, development work is focusing on the reduction of nitrogen oxide emissions, which are highly relevant especially in the case of diesel engines. Since the formation of nitrogen oxides requires not only excess air, but also high temperatures, one concept for reducing the nitrogen oxide emissions involves the development of combustion processes and methods with lower combustion temperatures.

Highly suitable here is exhaust gas recirculation (EGR, 414, see FIG. 4), i.e. the return of combustion gases from the exhaust line (404) into the intake line, (416, see FIG. 4), in which the nitrogen oxide emissions can be significantly reduced as the exhaust gas recirculation rate increases. The exhaust gas recirculation rate $x_{EGR}$ is here determined as follows:

$$x_{EGR} = m_{EGR}/(m_{EGR} + m_{fresh\ air})$$

where $m_{EGR}$ denotes the mass of recirculated exhaust gas and $m_{fresh\ air}$ the fresh air intake or the combustion air—possibly delivered and compressed by a compressor.

Exhaust gas recirculation is also suited to the reduction of emissions of unburned hydrocarbons in the partial load range.

In order to achieve a significant reduction of the nitrogen oxide emissions, high exhaust gas recirculation rates are necessary, which may be in the order of $x_{EGR} \approx 60\%$ to 70%.

A conflict arises, however, when operating an internal combustion engine with exhaust turbo-charging whilst simultaneously using exhaust gas recirculation, since the recirculated exhaust gas $m_{EGR}$ is generally extracted from the exhaust line upstream of the turbine and is no longer available to drive the turbine. This conflict can be readily illustrated by reference to a single-stage supercharged internal combustion engine with an exhaust-driven turbocharger.

With an increase in the exhaust gas recirculation rate $x_{EGR}$ there is a simultaneous decrease in the residual exhaust gas mass flow $m_T$ delivered to the turbine. The smaller exhaust gas mass flow $m_T$ through the turbine leads to a lower turbine pressure ratio $p_3/p_4$. As the turbine pressure ratio $p_3/p_4$ falls, the charge-air pressure ratio $p_1/p_2$ likewise diminishes, which is tantamount to a smaller compressor mass flow $m_{fresh\ air}$. Besides the falling charge-air pressure $p_2$, additional problems can arise in operating the compressor, with regard to the pumping limit of the compressor. Basically, however, the aim is for sufficiently high charge-air pressures $p_2$ and high exhaust gas recirculation rates $x_{EGR}$ under all operating conditions.

The conflict highlighted between exhaust gas recirculation and supercharging is rendered more difficult in that the recirculation of exhaust gas from the exhaust line into the intake line requires a pressure differential, i.e. a pressure gradient $(p_3-p_2)$ from the exhaust gas side to the intake side. In order to obtain the required high exhaust gas recirculation rates $x_{EGR}$, a large pressure gradient is furthermore necessary. This objective calls for a low charge-air pressure $p_2$ or a charge-air pressure $p_2$ which is lower than the exhaust back pressure $p_3$ in the exhaust line used for exhaust gas recirculation, which is at odds with the aforesaid requirement for a high charge-air pressure $p_2$.

The configuration of the exhaust-driven turbocharger presents fundamental difficulties—that is to say even without exhaust gas recirculation—the aim being for a discernible power boost in all engine speed ranges. In the state of the art, however, a sharp decrease in the torque is observed below a specific engine speed. This effect is undesirable, since the driver expects a correspondingly high torque even in the lower engine speed range compared to a non-supercharged engine of equal maximum power output. The so-called turbo hole at low revolutions is therefore also one of the more serious disadvantages of exhaust turbo-charging.

This drop in torque is understandable considering that the charge-air pressure ratio $p_1/p_2$ varies as a function of the turbine pressure ratio $p_3/p_4$. If the engine speed $n_{mot}$ is reduced in a diesel engine, for example, this leads to smaller exhaust gas mass flow $m_T$ and hence to a lower turbine pressure ratio $p_3/p_4$. This means that towards the lower engine speeds $n_{mot}$ the charge-air pressure ratio $p_1/p_2$ likewise diminishes, which is tantamount to a drop in torque.

The fall in charge-air pressure can basically be counteracted by a reduction of the turbine cross section and the accompanying increase in the turbine pressure ratios, which has disadvantages at high engine speeds, however.

In practice, the correlations described often mean that the smallest possible exhaust-driven turbocharger is used, that is to say an exhaust-driven turbocharger with the smallest possible turbine cross section. Ultimately the drop in torque is therefore counteracted only to a very limited extent and the drop in torque is shifted further towards low engine speeds. There are, moreover, limits to this approach, i.e. the reduction of the turbine cross section, since the desired supercharging and power boost are meant to be possible without restriction and to the required extent, even at high engine speeds.

In the state of the art, various measures are employed in an attempt to improve the torque characteristic of a supercharged internal combustion engine.

One such measure, for example, is to design the turbine with a small turbine cross section in conjunction with exhaust gas blow-off, it being possible to control the exhaust gas blow-off by means of the charge-air pressure or by means of the exhaust gas pressure. Such a turbine is also referred to as a wastegate turbine. If the exhaust gas mass flow exceeds a critical value, a proportion of the exhaust gas flow is made to bypass the turbine by means of a bypass line (420, see FIG. 4) as part of the so-called exhaust gas blow-off. As already stated above, however, this process has the disadvantage that the supercharging response is inadequate at higher engine speeds.

In principle it is also possible to design the turbine with a small cross section in conjunction with a charge air blow-off, this variant seldom being used due to the energy disadvantages of the charge air blow-off, i.e. the impaired overall efficiency, and the existing compressors may reach their delivery limit, so that the desired power output can no longer be achieved.

In diesel engines, designing the turbine with a small cross section whilst at the same time limiting the charge-air pressure by reducing the fuel mass at high engine speeds may be appropriate. However, this does not entirely exhaust the possibilities for boosting the power by means of exhaust turbo-charging.

The exhaust-driven turbocharger can also be designed, however, with a large turbine cross section adapted to high engine speeds. In this case, the intake system is then preferably designed in such a way that a dynamic supercharging is achieved by pressure wave phenomena at low engine speeds. Disadvantages to this are the high build cost and the sluggish response to engine speed changes.

A turbine (406) with variable turbine geometry (VTG) allows the turbine geometry or the effective turbine cross section to be adjusted to the respective operating point of the internal combustion engine, so that the turbine geometry can be adjusted for low and high engine speeds and for low and high loads.

The torque characteristic of a supercharged internal combustion engine can in addition also advantageously be influenced by means of multiple exhaust-driven turbochargers connected in series or multiple exhaust-driven turbochargers connected in parallel. Even with these supercharger configurations, it may be necessary to determine the exhaust gas pressure upstream of one of the turbines provided in order, for example, to control the supercharging and/or any exhaust gas recirculation provided and/or a bypass line bypassing the turbine, i.e. the blow-off line, the engine management system generally being used for this purpose.

By connecting two exhaust-driven turbochargers in series, of which one exhaust-driven turbocharger serves as high-pressure stage and one exhaust-driven turbocharger as low-pressure stage, it is advantageously possible to widen the compressor characteristics mapping towards both smaller compressor flows and larger compressor flows.

In particular, it is possible in the case of the exhaust-driven turbocharger serving as high-pressure stage to shift the pumping limit towards smaller compressor flows, so that high charge-air pressure ratios can be obtained even with small compressor flows, which significantly improves the torque characteristic in the lower partial load range. This is achieved by designing the high-pressure turbine for small exhaust gas mass flows and providing a bypass line or blow-off line bypassing the high-pressure turbine, by means of which exhaust gas is increasingly made to bypass the high-pressure turbine or is blown of as the exhaust gas mass flow increases.

For this purpose the bypass line branches off from the exhaust line upstream of the high-pressure turbine (e.g., 406) and opens back into the exhaust line downstream of this turbine, in order to duct the quantity of exhaust gas blown off through the low-pressure turbine (418). The bypass or blow-off lines bypassing the compressor can be used for charge air blow-off or recirculation.

Two exhaust-driven turbochargers connected in series also afford further advantages, however. The reason for this is that the smaller high-pressure stage is less sluggish than a larger exhaust-driven turbocharger used for single-stage supercharging, because the rotor of a smaller exhaust-driven turbocharger can be accelerated and retarded more rapidly.

In compound supercharging, multiple turbochargers connected in parallel with correspondingly small turbine cross sections are activated as the load increases.

Multiple turbochargers connected in parallel are suitable for improving the torque characteristic even when they are configured in such a way that the cylinders of the internal combustion engine are divided into two groups of cylinders, each having an exhaust line and an exhaust-driven turbocharger being assigned to each of the two exhaust lines or each group of cylinders. The turbine of the first exhaust-driven turbocharger is here arranged in the exhaust line of the first group of cylinders, whilst the turbine of the second exhaust-driven turbocharger is arranged in the exhaust line of the second group of cylinders. There is the option of providing an additional exhaust line, which connects the two groups of cylinders together on the exhaust side, i.e. upstream of the two turbines.

The compressors of the exhaust-driven turbochargers are either arranged—parallel to one another—in two separate intake lines, which are combined to form an intake manifold, or are arranged connected in series, i.e. in tandem in a common intake line.

The examples of supercharger arrangements cited hitherto indicate that the method for determining the exhaust gas pressure upstream of a turbine, which forms the subject matter of the present application, is not confined to internal combustion engines with single-stage supercharging having only a single exhaust-driven turbocharger.

The control, especially of a multistage supercharged internal combustion engine, is very complex and demanding, especially when the internal combustion engine is additionally equipped with exhaust gas recirculation.

One state variable to which substantial importance attaches is the exhaust gas pressure $p_3$ upstream of a turbine arranged in the exhaust line, for example in order to control the quantity of exhaust gas blown off by means of a bypass line bypassing the turbine.

In the case of exhaust gas recirculation, in which the recirculated exhaust gas is drawn off from the exhaust line upstream of the turbine ($p_3, T_3$) and is introduced back into the intake line downstream of the compressor (430, see FIG. 4) ($p_2, T_2$), the recirculated exhaust gas mass flow $m_{EGR}$ is controlled by means of a valve provided in the return line.

The recirculated exhaust gas mass flow $m_{EGR}$ can be calculated relatively accurately, if the pressure differential ($p_3-p_2$), the temperature difference and the valve position, i.e. the flow cross section in the return line available for the exhaust gas, are known. Here an isentropic nozzle equation, for example, is used as model.

A precise knowledge of the exhaust back pressure $p_3$ is moreover helpful for improving the variable behavior of the internal combustion engine. Particular allowance must be made here for the fact that the various systems, which characterize the operation of the internal combustion engine and which have to be continually adjusted in variable operation, respond at different rates. Whilst the fuel supply or the fuel injection have comparatively short reaction times, the exhaust gas recirculation and the fresh air supply of the internal combustion engine react rather sluggishly.

During an acceleration, the pressure $p_3$ increases sharply. If the exhaust back pressure $p_3$ is known, it is also possible to determine the gradient—i.e. the change in this pressure over time—and to use this for pilot control or correction of the fresh air mass and/or the recirculated exhaust gas mass.

It is basically possible to measure the exhaust gas pressure $p_3$ by means of a pressures sensor. The temperatures upstream of a turbine are, however, very high. Temperatures $T_3$ sometimes reach 800° C. or more. The thermal stresses acting on such a sensor are therefore very high, for which reason the life expectancy of the sensor is relatively low and the susceptibility to faults and the risk of complete failure are comparatively high. For these reasons alone, the method described for measuring the pressure $p_3$ is unsuitable for use in series production vehicles and does not represent a viable option according to the state of the art.

The corresponding pressure sensors are moreover extremely cost-intensive, for which reason in the state of the art they can be appropriately used only on test benches for calibrating internal combustion engines, and for test purposes, for example in order to generate a characteristics map for the exhaust back pressure $p_3$ upstream of the turbine, the pressure $p_3$, for example, being registered by means of pressure sensors and stored as a function of the load and the engine speed of the internal combustion engine. From the stored pressure values, characteristics maps can be prepared, which are then filed in the engine management system and in operation of the internal combustion engine supply an approximate value for the exhaust back pressure $p_{3,estimated}$ as a function of the instantaneous operating point.

For several reasons, the values for the exhaust back pressure read out from the characteristics map are an approximate value. For one thing, the characteristics map is compiled in tabular form, generally as a so-called n-dimensional look-up table, for which reason a more or less rough grid pattern or a more or less coarse resolution is obtained and intermediate values have, where necessary, to be interpolated, which of itself leads to a certain blurring of the pressure value $p_3$ provided, especially when it is borne in mind that the pressure value varies as function not only of the load and the engine speed but also, for example, of the EGR-rate, the ambient temperature and the like.

For another thing, it must be remembered that the measured values registered on the test bench are based on stationary operation of the internal combustion engine and the corresponding pressure values $p_3$ have only limited significance for the variable operation of the internal combustion engine.

Against this background, the object of the present application is to set forth a method for determining the exhaust back pressure $p_3$ upstream of a turbine, by means of which the exhaust back pressure $p_3$ can still be determined precisely but at little cost compared to methods known in the state of the art.

This object is achieved by a method for determining the exhaust back pressure $p_3$ upstream of a turbine, which is arranged in an exhaust line of an internal combustion engine equipped with an engine management system, the exhaust line being intended to lead off the exhaust gas from j cylinders of the internal combustion engine, in which the exhaust gas mass flow $m_T$ fed through the turbine is determined, the speed $n_T$ of the turbine is determined, the exhaust gas pressure $p_4$ downstream of the turbine is determined, the exhaust gas temperature $T_3$ upstream of the turbine is determined, an approximate value for the exhaust back pressure $p_{3,estimated}$ upstream of the turbine is read out from a prepared characteristics map filed in the engine management system, and the exhaust back pressure $p_3$ is read out from a prepared turbine characteristics map filed in the engine management system, the exhaust gas mass flow $m_T$, the speed $n_T$, the exhaust gas pressure $p_4$, the exhaust gas temperature $T_3$ and the approximate value for the exhaust back pressure $p_{3,estimated}$ being used as input variables.

The method according to the present application is based on a turbine characteristics map, which is filed, for example, as a five-dimensional look-up table in the engine management system and from which the instantaneous exhaust back pressure $p_3$ is read out.

As output variable, the characteristics map contains the exhaust back pressure $p_3$ to be determined, five operating parameters of the exhaust-driven turbocharger, that is the exhaust gas mass flow $m_T$ instantaneously fed through the turbine, the turbine speed $n_T$, the exhaust gas pressure $p_4$ downstream of the turbine, the exhaust gas temperature $T_3$ upstream of the turbine and an approximate value for the exhaust back pressure $p_{3,estimated}$ being used as input variables in order to define or establish the instantaneous operating point of the internal combustion engine, being necessary in order to assign a concrete value for the state variable $p_3$, i.e. for the exhaust back pressure to the instantaneous values of the operating parameters used as input variables, i.e. to the instantaneous operating state of the internal combustion engine and/or the exhaust-driven turbocharger.

FIG. 1 represents a turbine characteristics map of the type on which the method according to the present application is based, the characteristics map—for a better understanding and in order to illustrate the determining correlations more clearly—being reproduced not as look-up table or in some other tabular form, but instead being shown in the form of a graph.

The expression plotted on the ordinate is calculated from the exhaust gas mass flow $m_T$, the exhaust gas temperature $T_3$ upstream of the turbine and the approximate value for the exhaust back pressure $p_{3,estimated}$, which is abbreviated to $p_{3t}$.

The approximate value $p_{3t}$ for the exhaust back pressure is taken from a prepared, characteristics map filed in the engine management system. Although the object of the method according to the present application is just to determine the exhaust back pressure $p_3$ more precisely than is possible according to the state of the art, at a still acceptable cost, this procedure for initially using an approximate value in order to determine a more precise value for $p_3$ is not at odds with the stated aim.

It is to be remembered here that the numerator of the expression plotted on the ordinate varies much more sharply than the denominator. Whilst the temperature $T_3$, for example, can assume values of between 150° C. and 800° C., the exhaust back pressure $p_3$ or $p_{3t}$ varies within a comparatively tight range of values, for example between 2 and 3.5 bar. The exhaust gas mass flow $m_T$ behaves similarly in comparison to the exhaust back pressure, which is why, on the one hand, only small deviations of the approximate value $p_{3t}$ from the actual exhaust back pressure $p_3$, acceptable for the required purpose at this point, have to be accepted, and why, on the other hand, these deviations—if they then occur—are of an order of magnitude which, in the case of the expression or term under consideration here, are of lesser significance and according to the present application are disregarded.

The approximate value for the exhaust back pressure $p_{3t}$ is taken from a prepared characteristics map filed in the engine management system. This characteristics map can be generated or prepared in the way described in the introductory part of the description.

That is to say, the exhaust back pressure $p_{3t}$ is measured on a test bench—as part of the calibration of the internal combustion engine and/or the exhaust-driven turbocharger—by means of pressure sensor for a number of operating points, i.e. operating states of the internal combustion engine, and is assigned to these operating points, for example in the form of a characteristics map.

A concrete value for the expression plotted on the ordinate leads, together with a concrete, previously determined turbine speed $n_T$, to a concrete value for the turbine pressure ratio $p_3/p_4$, which is plotted on the abscissa. The continuous lines of constant speed ($n_T$=constant) are arranged in a fan shape and link the operating points of equal speed to one another.

Once the exhaust gas pressure $p_4$ downstream of the turbine has been determined, the turbine pressure ratio $p_3/p_4$ can be used to calculate the exhaust back pressure $p_3$ to be determined.

The object of the present application, namely to set forth a method for determining the exhaust back pressure $p_3$ upstream of a turbine, by means of which the exhaust back pressure $p_3$ can still be determined precisely but at little cost compared to methods known in the state of the art, is thereby achieved.

Further advantageous variants of the method are discussed in connection with the embodiments according to the dependent claims.

Advantageous embodiments of the method are ones in which the exhaust gas mass flow $m_T$ fed through the turbine is calculated using the engine speed $n_{mot}$ of the internal combustion engine, the air mass flow $m_L$ provided for the j cylinders, and the fuel mass $m_{fuel}$ provided for the j cylinders.

This variant of the method is advantageous, because the operating parameters which according to the embodiment in question are to be used for determining the exhaust gas mass flow $m_T$ are generally already available and in the state of the art are used by an engine management system for controlling the internal combustion engine.

As one of the most important operating parameters, the engine speed $n_{mot}$ of the internal combustion engine is determined. In one example, the engine speed may be used for all determinations, and in other examples it may be eliminated.

Figure 4:
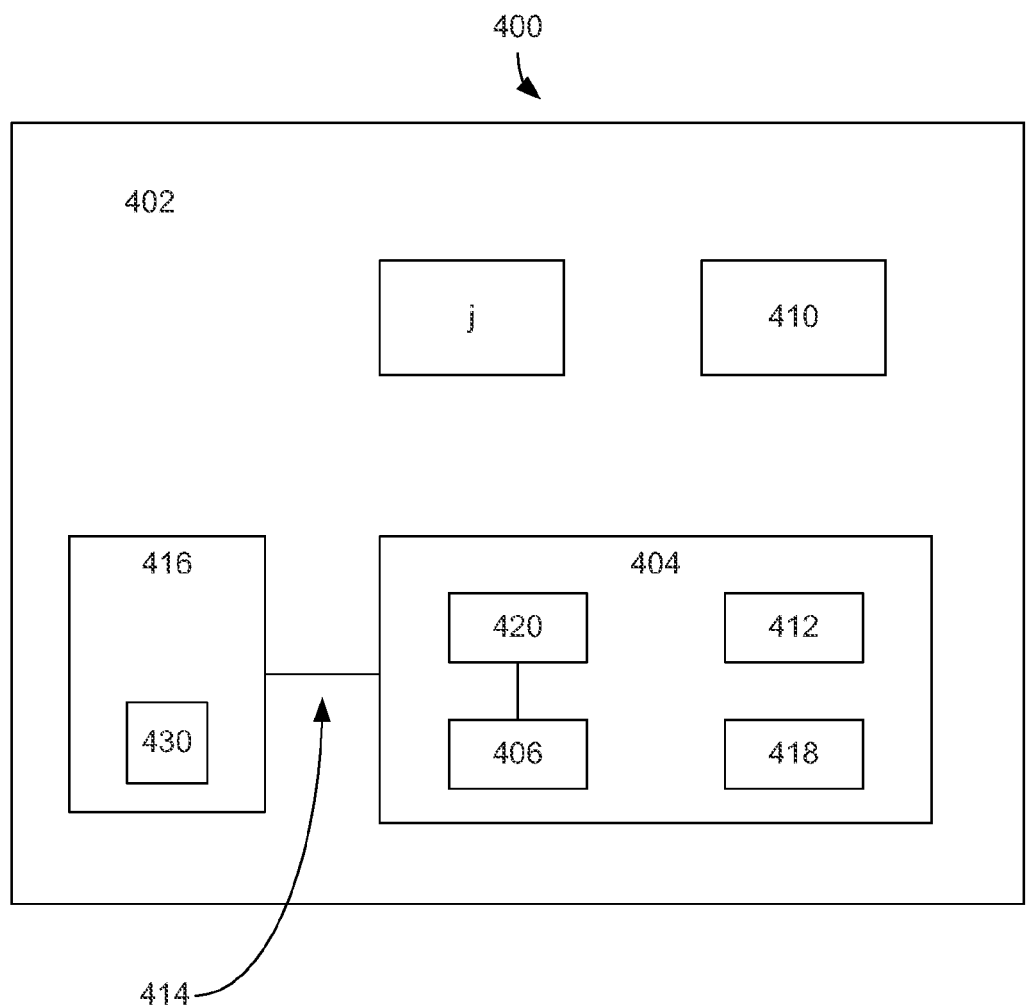
FIG. 4 shows an example system 400.

According to the state of the art, the position of the individual cylinders of an internal combustion engine and the engine speed $n_{mot}$ are determined by means of a camshaft sensor and/or a crankshaft sensor (410, see FIG. 4). A fixed crankshaft sensor arranged on the internal combustion engine here picks off signals from a ring or toothed rim, which rotates with the crankshaft and may be provided on the flywheel, for example. The signal generated by the crankshaft sensor is used by the engine management system to calculate the engine speed $n_{mot}$ and the angular position of the crankshaft. The engine management system needs these data, for example, in order to calculate the ignition setting, the fuel injection and the fuel quantity, and in particular for synchronizing the ignition and the fuel injection.

The air mass flow $m_L$ provided and the fuel mass $m_{fuel}$ provided are often also known and are important operating parameters of the internal combustion engine.

The fuel mass $m_{fuel}$ is itself an operating parameter which in the operation of the internal combustion engine is monitored by the engine management system and which serves to influence the injection period and the injection pressure. The air mass flow $m_L$ can be and is according to the state of the art often measured by means of a resistance wire provided in the intake line.

From the statements above it follows that no additional sensors are needed to precisely determine the exhaust gas mass flow $m_T$, because the operating parameters required or used are, in the state of the art, often already determined for controlling the internal combustion engine and are therefore already available.

The variant of the method in question assumes an internal combustion engine in which either no exhaust gas is recirculated or the return line for the hot exhaust gas branches off from the exhaust line upstream of the turbine and opens back into the intake line downstream of the point where the air mass flow $m_L$ is registered, so that any recirculated quantity of exhaust gas $m_{EGR}$ does not need to be taken into account when determining the exhaust gas mass flow $m_T$ that is led through the turbine.

If the exhaust gas for recirculation is drawn or branches off from the exhaust line downstream of the turbine, this is to be taken into account.

Advantageous embodiments of the method are ones in which the speed $n_T$ of the turbine is measured by means of a sensor.

Advantageous embodiments of the method are ones in which the exhaust gas pressure $p_4$ downstream of the turbine is calculated according to the equation $p_4=p_{atm}+\Delta p$, where $\Delta p$ represents the pressure drop over the exhaust line downstream of the turbine up to the outlet of the exhaust line and is determined by calculation. Of advantage here are variants of the method in which mathematical models for exhaust gas aftertreatment systems (412, see FIG. 4) provided in the exhaust line are used in calculating the pressure drop $\Delta p$.

The atmospheric pressure, i.e. the ambient pressure $p_{atm}$ is always determined in the context of the engine management system.

In order to meet future limits for pollutant emissions, according to the state of the art various exhaust gas aftertreatment systems are arranged in the exhaust line downstream of the turbine, in particular oxidation catalytic converters, particle filters, nitrogen oxide storage (LNT) catalytic converters or SCR catalytic converters. For monitoring and control of these systems, mathematical models are also used in addition to measured state variables—such as the exhaust gas pressure, for example. These models serve, for example, to determine the accumulated load on a particle filter or the sulfur contamination of an LNT, in order to control or initiate the regeneration of the filter or the desulphurization of the LNT. At the same time the pressure drop $\Delta p_i$ occurring over the respective exhaust gas aftertreatment system is an important state variable of the system, which if not already measured by a corresponding arrangement of pressure sensors is determined by calculation.

The pressure drop $\Delta p$ over the exhaust line downstream of the turbine up to the outlet of the exhaust line is obtained from the sum of the pressure losses $\Delta p_i$, which occur via the individual systems provided in the exhaust line.

Calculating the pressure drop $\Delta p$ or $\Delta p_i$ by means of an mathematical model has the advantage compared to a measurement that no sensors are intrinsically necessary, thereby making calculation more cost-effective for use in series production.

Advantageous embodiments of the method are ones in which the exhaust gas temperature $T_3$ is calculated using the engine speed $n_{mot}$ of the internal combustion engine, the load of the internal combustion engine and the air ratio $\lambda$. The air ratio $\lambda$ can be determined, if—as here—the air mass flow $m_L$ and the fuel mass $m_{fuel}$ are known.

The load can basically be specified in the form of the torque or as the mean pressure $p_{me}$. The instantaneous effective mean pressure $p_{me}$ is generally already determined, for example for the load control or a feedback control of the indexed torque.

Advantageous embodiments of the method are ones in which, when reading out the approximate value $p_{3,estimated}$, the engine speed $n_{mot}$ and the load of the internal combustion engine are used as input variables for the characteristics map. As already stated above, the load and the engine speed $n_{mot}$ are important operating parameters, which are of particular significance in controlling the internal combustion engine, and are already available, i.e. they are known to the engine management system and consequently do not need to be determined in an additional step of the method.

Advantageous embodiments of the method are ones in which the characteristics map for the approximate value $p_{3,estimated}$ is generated and prepared on a test bench, the exhaust back pressure $p_3$ upstream of the turbine being measured by means of a sensor. With regard to this embodiment, reference is made to the descriptions already given above.

In the case of a turbine which is equipped with a variable turbine geometry (VTG), variants of the method are advantageous in which, for determining the exhaust back pressure $p_3$ upstream of a turbine, the position $VTG_{pos}$ of the variable turbine geometry is additionally used as input variable for the turbine characteristics map.

Adjusting the turbine geometry causes ratios on the turbine to vary, in particular the flow cross section provided for the exhaust gas mass flow. This factor is also taken into account in the turbine characteristics map, as can be seen from FIG. 1. The position $VTG_{pos}$ of the variable turbine geometry is taken into account as an additional turbine operating parameter. The percentages, which provide information on the opening cross section of the turbine, are plotted on the left-hand side of the diagram in FIG. 1. The higher the percentage figure, the smaller the flow cross section available to the exhaust gas, it being possible to vary the turbine cross section between a maximum closed position and a minimum closed position, i.e. a maximum opening position.

Lines are assigned to the percentages, on which the peripheral speeds of the turbine rotor are given in meters per second (m/s). If the blades of the turbine are moved towards the closed position and the flow cross section is reduced, the turbine pressure ratio $p_3/p_4$, is increased for the same exhaust gas mass flow $m_T$.

FIG. 1 in schematic form shows a turbine characteristics map of an exhaust-driven turbocharger with variable turbine geometry (VTG). This figure has already been discussed in detail above in describing the object according to the present application, for which reason it is not proposed to give any further explanations here.

Figure 2:
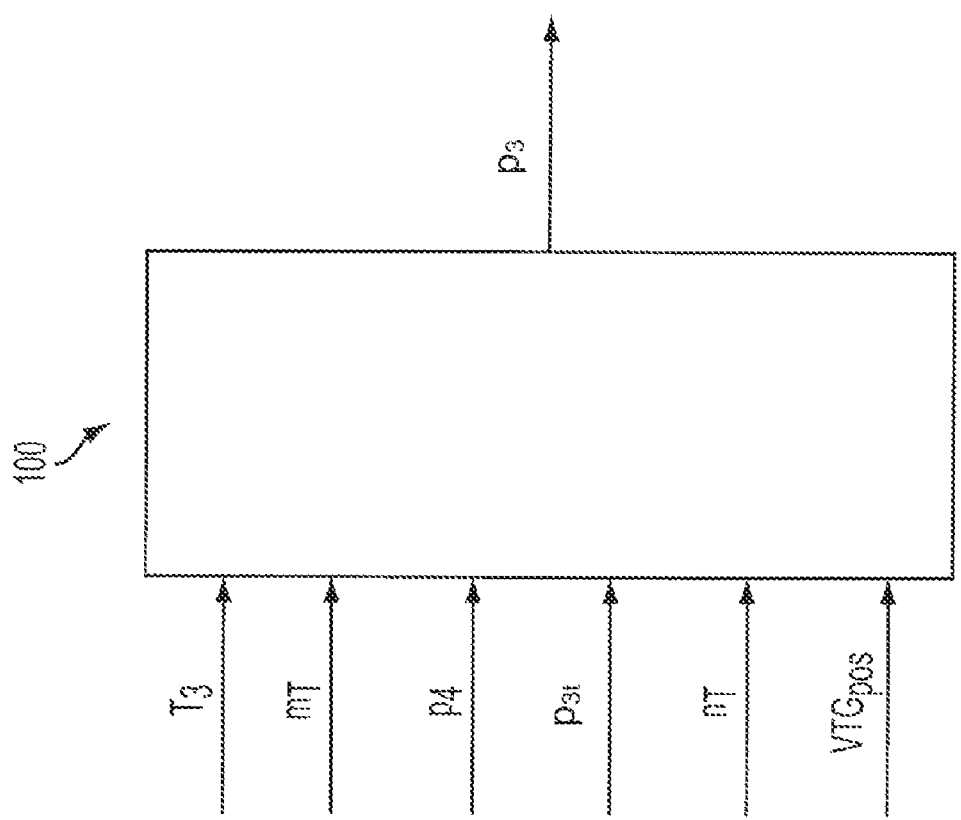

FIG. 2 in schematic form shows the general method 100 according to one embodiment of the method for an exhaust-driven turbocharger with variable turbine geometry.

Figure 3:
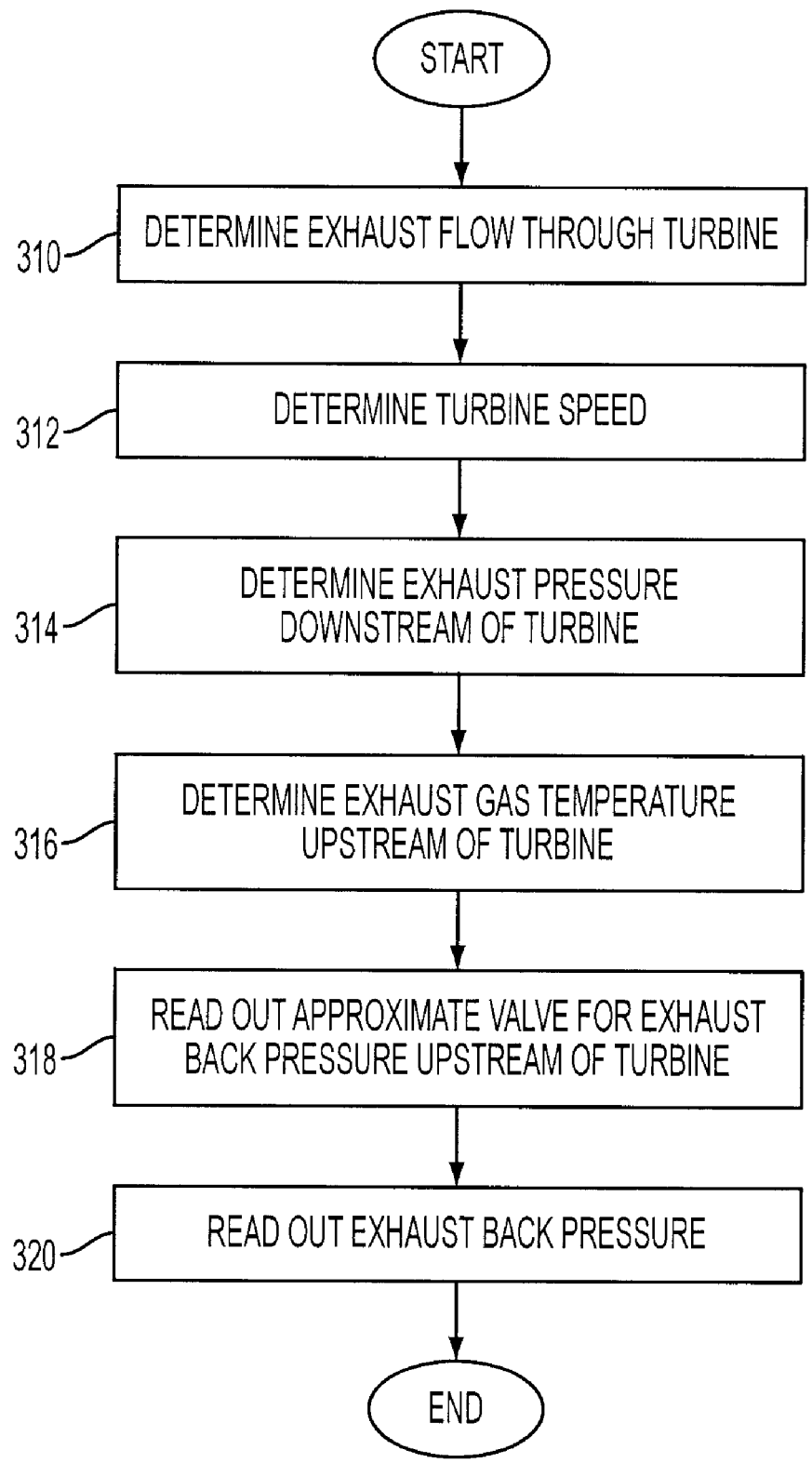
FIG. 3 shows the general method according to one embodiment of the method.

For determining the exhaust back pressure $p_3$ upstream of a turbine, as shown in the routine of FIG. 3, the engine management system 1 of the internal combustion engine uses the exhaust gas mass flow $m_T$ fed through the turbine (310), the speed $n_T$ of the turbine (312), the exhaust gas pressure $p_4$ downstream of the turbine (314), the exhaust gas temperature $T_3$ upstream of the turbine (316), an approximate value for the exhaust back pressure $p_{3t}$ upstream of the turbine (318) and the position $VTG_{pos}$ of the variable turbine geometry as input variables, in order to read out the exhaust back pressure $p_3$ upstream of the turbine (320) from a prepared turbine characteristics map filed in the engine management system 1.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

REFERENCE NUMERALS

| | |
|---|---|
| 1 | engine management system |
| EGR | exhaust gas recirculation |
| j | number of cylinders |
| λ | air ratio |
| $m_{EGR}$ | mass of recirculated exhaust gas |
| $m_{fresh\ air}$ | mass of fresh air or combustion air delivered |
| $m_{fuel}$ | fuel mass supplied for the j cylinders |
| $m_L$ | air flow supplied for the j cylinders |
| $m_T$ | exhaust gas mass flow fed through the turbine |
| $n_{mot}$ | engine speed of the internal combustion engine |
| $n_T$ | speed of the turbine |
| $p_1$ | pressure upstream of the compressor |
| $p_2$ | charge-air pressure downstream of the compressor |
| $p_3$ | exhaust back pressure upstream of the turbine |
| $p_{3,estimated}$, $p_{3t}$ | approximate value for the exhaust back pressure upstream of the turbine |
| $p_4$ | exhaust gas pressure downstream of the turbine |
| $p_{atm}$ | atmospheric pressure, ambient pressure |
| $p_{me}$ | mean pressure |
| Δp | pressure drop over the exhaust line downstream of the turbine |
| $Δp_i$ | pressure drop over an exhaust gas after treatment system |
| $p_1/p_2$ | charge-air pressure ratio |
| $p_3/p_4$ | turbine pressure ratio |
| $T_2$ | charge-air temperature |
| $T_3$ | exhaust gas temperature upstream of the turbine |
| VTG | variable turbine geometry |
| $VTG_{pos}$ | the position of the variable turbine geometry |
| $x_{EGR}$ | exhaust gas recirculation rate |

We claim:

1. A method of operating a system having an engine having a multistage turbocharger with first and second turbines of coupled in the engine exhaust, and an exhaust-gas bypass coupled around the first turbine being upstream of the second turbine, the method comprising:
controlling operation of the bypass in response to an exhaust back pressure upstream of the first turbine ($p_3$), where $p_3$ is based on exhaust gas mass flow $m_T$, engine speed $n_T$, exhaust gas pressure downstream of the first turbine, and exhaust gas temperature.

2. The method of claim 1 where the system further comprises an exhaust gas recirculation system, the method further comprising controlling exhaust gas recirculation in response to the exhaust back pressure upstream of the first turbine.

3. A method for determining an exhaust back pressure $p_3$ upstream of a turbine, which is equipped with a bypass line bypassing the turbine, the turbine arranged in an exhaust line of an internal combustion engine equipped with an engine management system, which exhaust line is intended for leading off the exhaust gas from a number of cylinders of the internal combustion engine, the method comprising:
determining exhaust gas mass flow $m_T$ fed through the turbine;
determining speed $n_T$ of the turbine,
determining exhaust gas pressure $p_4$ downstream of the turbine,
determining exhaust gas temperature $T_3$ upstream of the turbine,
reading out an approximate value for exhaust back pressure $p_{3,estimated}$ upstream of the turbine from a prepared, characteristics map stored in the engine management system,
reading out the exhaust back pressure $p_3$ from a prepared, turbine characteristics map stored in the engine management system, the exhaust gas mass flow $m_T$, the speed $n_T$, the exhaust gas pressure $p_4$, the exhaust gas temperature $T_3$ and the approximate value for the exhaust back pressure $p_{3,estimated}$ being used as input variables for the prepared, turbine characteristic map; and
adjusting the bypass line in response to read out exhaust back pressure.

4. The method as claimed in claim 3, wherein said determining the exhaust gas mass flow $m_T$ fed through the turbine is based on engine speed $n_{mot}$ of the internal combustion engine, air mass flow $m_L$ provided for the number of cylinders and fuel mass $m_{fuel}$ provided for the number of cylinders.

5. The method as claimed in claim 4, further comprising providing a sensor for measuring the speed $n_T$ of the turbine.

6. The method as claimed in claim 5, wherein calculating the exhaust gas pressure $p_4$ downstream of the turbine is according to an equation $p_4 = p_{atm} + Δp$, where Δp represents pressure drop calculated over the exhaust line downstream of the turbine up to an outlet of the exhaust line.

7. The method as claimed in claim 6, wherein said determining the exhaust gas temperature $T_3$ is based on the engine speed $n_{mot}$ of the internal combustion engine, load of the internal combustion engine and relative air-fuel ratio λ.

8. The method as claimed in claim 7, further comprising reading out the approximate value $p_{3,estimated}$ based on the engine speed $n_{mot}$ and the load of the internal combustion engine as input variables for the characteristics map.

9. The method as claimed in claim 8, further comprising generating and preparing the characteristics map for the approximate value $p_{3,estimated}$ on a test bench, and measuring the exhaust back pressure $p_3$ upstream of the turbine with a sensor.

10. The method as claimed in claim 9 for determining the exhaust back pressure $p_3$ upstream of a turbine, which is equipped with a variable turbine geometry (VTG), further comprising reading out the approximate value $p_{3,estimated}$ based on a position $VTG_{pos}$ of the variable turbine geometry as an input variable for the turbine characteristics map.

11. A system, comprising:
an engine having first and second turbines of a multistage turbocharger coupled in the engine exhaust in series, an exhaust-gas bypass coupled to the first turbine being upstream of the second turbine;

an engine management system controlling the bypass in response to an exhaust back pressure upstream of the first turbine ($p_3$), where p3 is based on exhaust gas mass flow $m_T$, engine speed $n_T$, exhaust gas pressure downstream of the first turbine, and exhaust gas temperature.

12. The system of claim 11 further comprising an exhaust gas recirculation system, where the engine management system further controls the exhaust-gas recirculation in response to the exhaust back pressure upstream of the first turbine.

13. The system of claim 12 wherein the exhaust gas bypass line bypassing the first turbine controls a quantity of blown off exhaust gas.

14. The system of claim 12 where the engine management system adjusts recirculated exhaust gas in response to a sharp increase in exhaust back pressure upstream of the first turbine.

15. The system of claim 11 further comprising an exhaust gas recirculation system in which the recirculated exhaust gas is drawn off from the exhaust upstream of the first turbine and is introduced back into the intake line downstream of a compressor of the turbocharger, where the engine management system further controls an amount of recirculated exhaust gas mass flow in response to the exhaust back pressure upstream of the first turbine.

16. The system of claim 11 wherein the turbocharger is a variable geometry turbocharger, and where the engine management system controls operation of the variable geometry turbocharger in response to the exhaust back pressure upstream of the first turbine.

17. The system of claim 11, where the engine management system adjusts pilot control in response to a gradient in exhaust back pressure upstream of the first turbine.

18. The system of claim 11 where the engine management system adjusts fresh air mass in response to a sharp increase in exhaust back pressure upstream of the first turbine.

* * * * *